April 15, 1969 D. A. TAYLOR 3,439,114
FLUOROSCOPIC TELEVISION AND CINE-CAMERA SYSTEM
Filed April 17, 1967
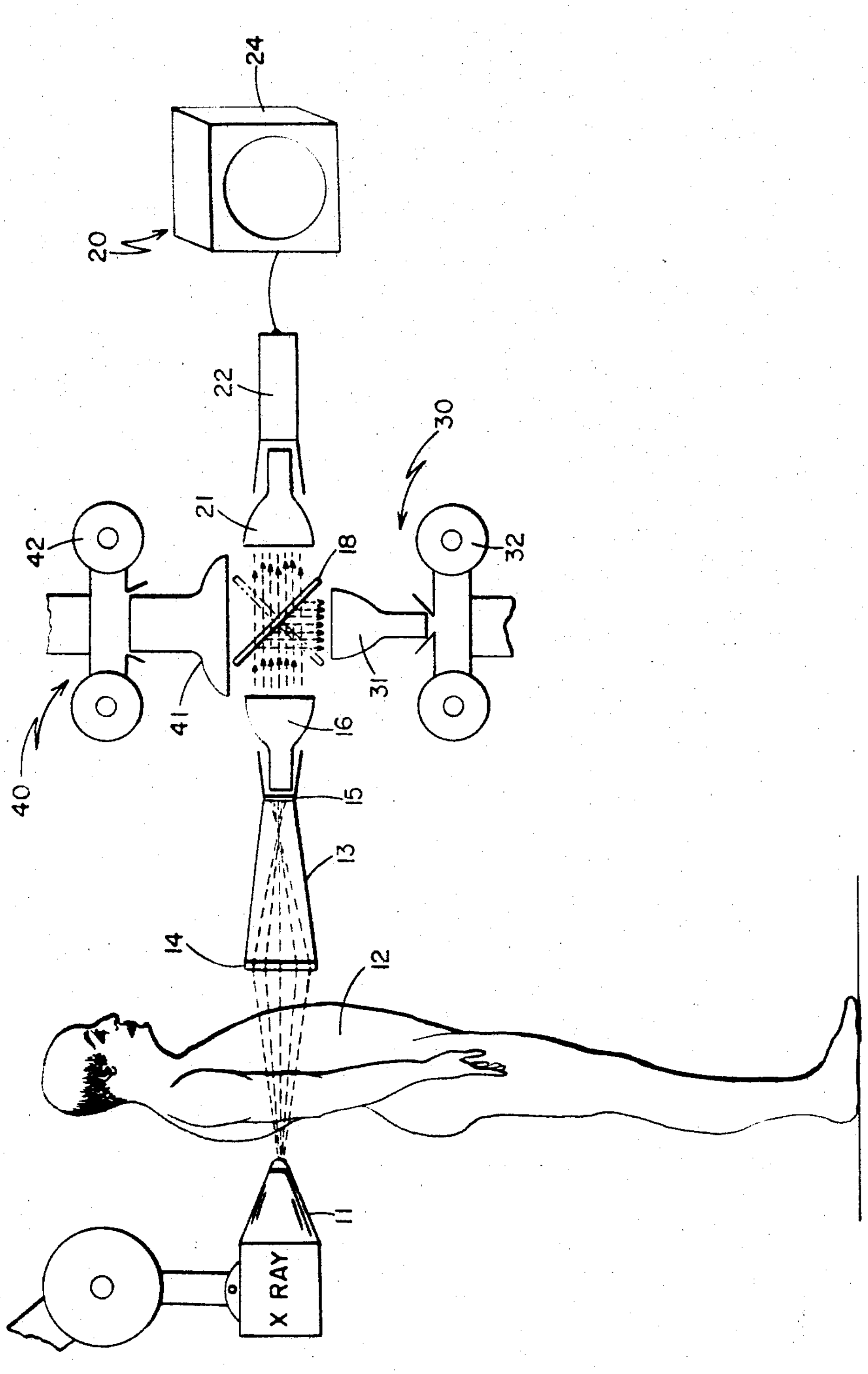

United States Patent Office 3,439,114
Patented Apr. 15, 1969

3,439,114

FLUOROSCOPIC TELEVISION AND CINE-CAMERA SYSTEM

Donald A. Taylor, 15 Partridge Road, Lexington, Mass. 02173

Filed Apr. 17, 1967, Ser. No. 631,477
Int. Cl. H04n *3/02;* H01j *29/89*
U.S. Cl. 178—6.8 10 Claims

ABSTRACT OF THE DISCLOSURE

A fluoroscopic television and cine-camera system is disclosed which for the first time permits the use of a Vidicon or Plumbicon type of television camera at very low radiation dose levels. The radiologist obtains more readable visual images.

BACKGROUND OF INVENTION

The physician's use of radiant energy, such as X-rays, in the diagnosis of disease was formerly limited to the direct viewing of a fluoroscopic screen or a photographic film exposed by the radiant energy, which provided limited readable information. With the advent of the electronic image-intensifier tube, it became possible to obtain more readable information without increasing the radiation dosage. This is significant since although radiant energy, such as X-rays, is an essential tool for diagnostic purposes, the radiologist must always be concerned with the cumulative dosage of radiant energy that his patient receives.

The electronic image-intensifier tube is an evacuated tube having a large input screen and a somewhat smaller output screen. The X-rays striking the input screen cause an emission of electrons in accordance with the X-ray image. These electrons are accelerated and focused in the tube so as to form a bright visual image on the output screen corresponding to the X-ray image on the input screen but of considerably greater intensity.

The electronic image-intensifier tube has been used with both a motion picture film camera (known as the cine-camera) and with television camera and receivers to provide the radiologist with means for achieving greatly improved viewing of the various parts of the human body being irradiated with X-rays. The cine-camera provides a means for permanently recording the motion of various parts of the human body in response to the tests and studies being conducted.

However, the quality of readable information obtained on the cine-movie film or on the television screen is directly related to the radiation dose and to the optical system used to transfer the image from the output screen of the image-intensifier tube to the recording or viewing system employed. Low X-ray doses can be used when employing an image orthicon television camera. However, such cameras are extremely expensive and have a poor image quality because of high inherent noise levels. Vidicon or Plumbicon television cameras produce far better images but require higher light levels and thus higher radiation dose levels. If used with low radiation these television cameras function poorly because of their insensitivity to low luminosity.

SUMMARY OF INVENTION

The present invention is concerned with a system which for the first time permits the use of the quieter Vidicon or Plumbicon type of television camera (an inexpensive substitute for the image orthicon tube) at very low radiation dose levels. The invention also provides a substantially more readable visual image for the radiologist than has hitherto been obtained with prior image-intensifier systems employing a Vidicon or Plumbicon.

The invention in its most essential terms comprises the use of an image-intensifier tube, e.g. a Phillips 6 or 9 inch tube, reguated so that the diameter of the image on the output screen is no greater than a critical maximum, which is herein exemplified as 19 millimeters. Close to the output screen is a collimating lens capable of covering a 22 millimeter image but which has no vignetting or distortion when covering the 19 millimeter image on the tube output screen. The lens must be capable of transmitting images of objects having a low luminosity on electronic tube anodes, and hence must be very fast, e.g. *f*/0.75. Further, this lens should be corrected for infinite object distances, e.g. positioned as closed as possible to the output phosphor while being focused on it at infinity. The light from the image produced at the output screen then emerges from the collimating lens as high intensity parallel light traveling parallel to the axis of the lens. This high intensity light is then directed into focusing lenses characterized as reducing or enlarging the collimated image to a diameter compatible with that of the format of the particular cine-film or television camera being employed. A beam splitting mirror is used to permit the simultaneous viewing of television during cine filming.

BRIEF DESCRIPTION OF THE DRAWING

The drawing is a schematic diagram showing the alignment of the various components of a specific example of this invention.

DESCRIPTION OF A SPECIFIC EXAMPLE

Referring now to the drawing, an X-ray source 11 is arranged to emit a dosage of an intensity necessary to excite the input screen 14 and thus the output screen 15 of an electronic image-intensifier tube 13. Such dosage is considerably lower than is customarily used with prior art equipment employing Vidicon or Plumbicon television cameras. The X-ray source 11 is adjusted in the usual manner to irradiate the selected portion of the human body 12 so as to produce an X-ray image on the input screen 14. Output screen 15 is regulated so that the image produced on it is no larger than 19 millimeters. Coupled to the output screen 15 is a collimating lens having an equivalent focal length of 65 millimeters, and a relative aperture (speed) of *f*/0.75, with a field of view of 10.5° and no vignetting when viewing an image of 19 millimeters. The particular lens employed is Rayxar E 65/0.75 lens optimally corrected for an infinite object distance and manufactured by M. V. Optische Industrie, Delft, Netherlands.

The output of this lens 16 is reflected and transmitted through a beam splitting mirror 18 to both a television camera assembly 20 and a cine-camera assembly 30 when simultaneous viewing and filming is carried out. The beam splitting mirror 18 is retracted when employing only television. The television assembly 20 comprises a focusing lens 21 having an equivalent focal length of 32 to 50 millimeters which is ultra-fast, e.g. *f*/0.75–*f*/0.95. The particular lens used was Rayxar E 50/0/75 manufactured by M. V. Optische Industrie. This results in slight overframing of the television picture and cine-film. One may employ a Rayxar E 32/0.75 and not have any overframing. To this focusing lens 21 is coupled a Vidicon or Plumbicon television camera 22 whose output is fed to a television receiver 24.

The cine-camera assembly 30 comprises a focusing lens 31 of similar construction and characteristics as focusing lens 21 or its equivalent described above. The lens 31 is spaced in the opening of a 16-millimeter camera 32. Pulsed X-rays are used and the camera shutter removed where the back focal length of the lens is short.

A 70-millimeter cine-camera may also be incorporated into this system. In the drawing the 70-millimeter assembly 40 comprises a focusing lens 41 coupled to the opening of a 70-millimeter camera 42. Lens 41 has a focal length of 280–300 millimeters and an aperature of $f/2.8$.

I have found that with the television cameras and cine-cameras I obtain a bright image having a high readability throughout its entire area.

I have also found in my work with my patients that with this invention I can use one-fourth the amount of radiation normally necessary to produce the same quality image with prior systems. In this manner I am enabled to use a Vidicon or Plumbicon television camera at much lower dose levels and obtain a superior quality television image or cine-image with no vignetting. When used with either a Vidicon or Plumbicon tube, which are inherently less noisy and therefore produce better visual images, the system of this invention provides pictures of the highest quality with low noise and no vignetting at low dose levels.

I claim:

1. A fluoroscopic system comprising in combination: a source of radiant energy adapted to irradiate a selected portion of a target, an electronic image-intensifier tube having a receiving screen responsive to the radiant energy image and an output screen, said receiving screen being adjacent the target, the image on said output screen being regulated so as not to exceed a maximum image diameter of 19 millimeters, a collimating lens of high speed having no vignetting when viewing an image of 19 millimeters, the receiving portion of said lens being aligned and adjacent to the image on the output screen, a light-sensitive readout member, and a focusing lens adapted to receive the output image from the collimating lens and transform it to an image diameter compatible with the format of said light-sensitive readout member.

2. Claim 1 wherein said member is a film camera.

3. Claim 1 wherein said member is either a 16-millimeter or a 70-millimeter motion picture camera.

4. Claim 1 wherein said member is either a Vidicon, Plumbicon or image orthicon television camera.

5. Claim 1 wherein said member is a television camera.

6. Claim 1 wherein said collimating lens has a focal length of 65 millimeters, a relative aperture of $f/0.75$, an angle view of 10.5° and is characterized as having no vignetting when viewing an image of 19 millimeters.

7. Claim 1 wherein said focusing lens has a focal length of 32–50 millimeters with a relative aperture of $f/0.75$.

8. Claim 1 wherein said collimating lens has a focal length of 65 millimeters, a relative aperture of $f/0.75$, an angle of view of 10.5° and is characterized as having no vignetting when viewing an image of 19 millimeters, and said focusing lens has a focal length of 32–50 millimeters and a relative aperture of $f/0.75$.

9. The apparatus of claim 1 wherein a beam-splitting mirror is provided to direct a portion of the output of the collimating lens to both a film camera and a television camera.

10. Claim 3 wherein the focusing lens for said 70-millimeter camera has a focal length of 280–300 millimeters with a relative aperture of $f/2.8$.

References Cited

UNITED STATES PATENTS

| | | | |
|---|---|---|---|
| 2,757,293 | 7/1956 | Teves. | |
| 2,834,889 | 5/1958 | Fries | 250—65 |
| 2,857,523 | 10/1958 | Corso | 250—77 |
| 2,922,336 | 1/1960 | Van Alphen. | |
| 3,126,480 | 3/1964 | Bouwers | 250—65 |
| 3,187,093 | 6/1965 | Bouwers | 250—65 |

OTHER REFERENCES

T. Heise, Marquerinck and Seur: Special Circuits for an X-Ray Television Camera Chain, July 1966, Journal of SMPTE, vol. 75, pp. 645–646.

Sodee: Advances in Medical Scanning, September 1964, Nucleonics, vol. 2, No. 9, pp. 47–51.

ROBERT L. GRIFFIN, *Primary Examiner.*

JOSEPH A. ORSINO, Jr., *Assistant Examiner.*

U.S. Cl. X.R.

178—6, 7.85; 250—65, 77, 213